No. 888,930. PATENTED MAY 26, 1908.
J. ROBESKY.
BREAD MAKER'S GAGE.
APPLICATION FILED MAR. 20, 1907.

Witnesses.
R. H. Decker
J. B. Smutney

Inventor.
John Robesky.
by Orwig & Lane Attorneys.

UNITED STATES PATENT OFFICE.

JOHN ROBESKY, OF BAKERSFIELD, CALIFORNIA.

BREAD-MAKER'S GAGE.

No. 888,930.  Specification of Letters Patent.  Patented May 26, 1908.

Application filed March 20, 1907. Serial No. 363,366.

*To all whom it may concern:*

Be it known that I, JOHN ROBESKY, a citizen of the United States, residing at Bakersfield, in the county of Kern and State of California, have invented a certain new and useful Bread-Maker's Gage, of which the following is a specification.

The object of my invention is to provide a gage of simple, durable and inexpensive construction designed for use by bread makers, whereby the operator may, at a glance, determine accurately just how much the bread making dough has raised at any given time, so that he may determine whether or not the dough is in proper condition for forming into loaves.

My invention consists in the construction, arrangement and combination of the various parts of the device, whereby the objects contemplated are attained, as hereinafter more fully set forth, pointed out in my claims and illustrated in the accompanying drawings, in which—

Figure 1:
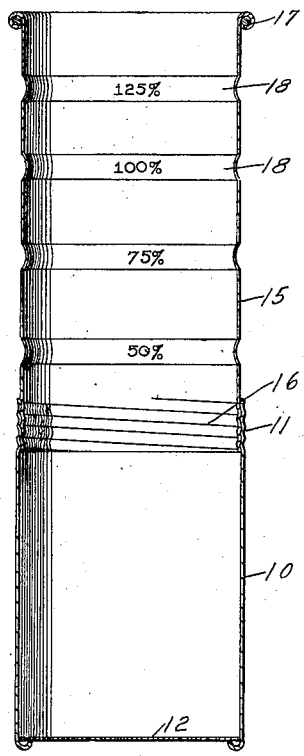
Figure 3:
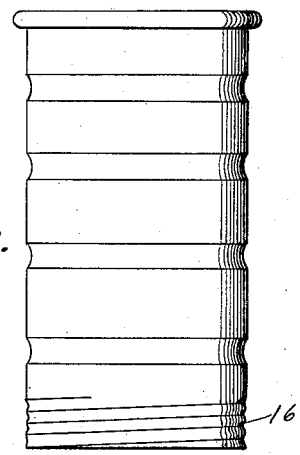
Figure 4:
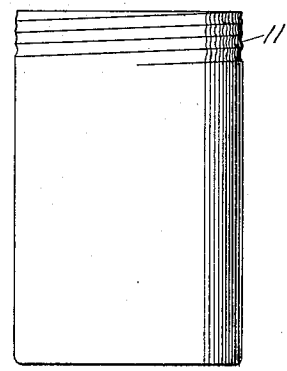
Figure 2:
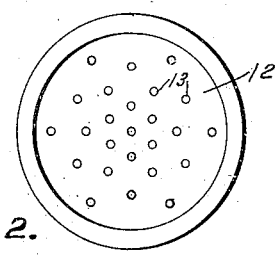

Figure 1 shows a vertical, central, sectional view of the complete gage. Fig. 2 shows a bottom view of same. Fig. 3 shows a side elevation of the top portion of the gage, and Fig. 4 is a side elevation of the bottom portion.

Referring to the accompanying drawings, the bottom portion of the gage is of cylindrical form and is indicated by the numeral 10. At its top is a screw-threaded portion 11 and its bottom 12 is provided with perforations 13. The top portion of the gage comprises a cylinder 15 open at both ends and having at its lower end a screw-threaded portion 16 to co-act with the screw-threaded part 11 and having at its top a rounded rib or margin 17. Throughout the length of the part 15 is a series of inwardly projected ribs 18 and on each rib is a number for designating the percentage of the raise in the dough that will take place when said rib is reached by the dough. The object of having these ribs bulged inwardly is that thereby the operator is enabled to read all of the marks on the ribs by looking into the part 15 from the top while if these marks were made on a smooth flat top, the operator could not readily read them.

In practical use, I first fill the bottom portion 10 full of dough taken from the quantity to be tested. The object of having the holes 13 in the bottom 12 is to enable the operator to quickly and easily fill the part 10 with dough as the said openings permit air to pass out while the dough is being placed in the part 10. I then connect the parts 15 and 10 of the gage by screwing them together and firmly place the gage in the quantity of dough to be tested. By having the top rounded at 17, the operator may easily and conveniently press the gage into the dough by hand. In this way the quantity of dough contained within the gage will be subjected to exactly the same conditions of temperature, etc., as the quantity of dough being tested and, therefore, when the dough within the gage rises to a certain degree all of the dough in the quantity being tested will have risen a corresponding degree. I have discovered that very satisfactory results can be obtained by waiting until the dough within the gage increases in size seventy-five per cent. and then forming it into loaves. Other bakers prefer to have the dough rise more or less before forming into loaves. However, by the use of my improved gage, each individual user will after having used the device a number of times determine for himself the exact percentage of raise which will produce the most satisfactory results for him and he then can by the use of the gage determine exactly and accurately when the dough has raised to the desired amount.

Having thus described my invention, what I claim and desire to secure by Letters Patent of the United States, therefor is—

1. In a bread maker's gage, the combination of a cylindrical bottom portion comprising a body of a uniform diameter open at its top and perforated at its bottom, a cylindrical top portion of a uniform diameter open at both ends, said top and bottom portions being provided with means for detachably connecting the top with the bottom when presented from above, said top portion also formed with an interior scale of indicating marks for the purpose of determining the percentage raise of the contents of the gage.

2. In a bread maker's gage, the combination of a bottom portion cylindrical in shape having its upper end formed with a screw thread and having its bottom perforated and a top portion of cylindrical form open at both ends and having its bottom screw-threaded to co-act with the screw-threaded part of the body portion and also having a series of ribs extended into its interior and percentage marks on said ribs so arranged that they may be conveniently seen through the open top.

Des Moines, Iowa, February 26, 1907.

JOHN ROBESKY.

Witnesses:
    A. F. STONER,
    F. D. McCLANAHAN.